United States Patent
Barabash

(10) Patent No.: US 11,540,146 B2
(45) Date of Patent: Dec. 27, 2022

(54) ACTIVE ANTENNA ARRAY DITHERING TO IMPROVE SCANNING EFFICIENCY AND REDUCE BEAM INDICES

(71) Applicant: NOKIA TECHNOLOGIES OY, Espoo (FI)

(72) Inventor: Darrell W. Barabash, Grapevine, TX (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/257,414

(22) PCT Filed: Jul. 20, 2018

(86) PCT No.: PCT/US2018/043135
§ 371 (c)(1),
(2) Date: Dec. 31, 2020

(87) PCT Pub. No.: WO2020/018118
PCT Pub. Date: Jan. 23, 2020

(65) Prior Publication Data
US 2021/0274360 A1   Sep. 2, 2021

(51) Int. Cl.
*H04W 16/28* (2009.01)
*H01Q 3/26* (2006.01)
*H01Q 3/36* (2006.01)

(52) U.S. Cl.
CPC .......... *H04W 16/28* (2013.01); *H01Q 3/2611* (2013.01); *H01Q 3/36* (2013.01)

(58) Field of Classification Search
CPC ....... H04W 16/28; H01Q 3/2611; H01Q 3/36; H04B 7/0686; H04B 7/0604
See application file for complete search history.

(56) References Cited

U.S. PATENT DOCUMENTS

| | | | |
|---|---|---|---|
| 6,463,301 B1* | 10/2002 | Bevan | H01Q 3/40 342/368 |
| 2006/0183503 A1* | 8/2006 | Jeffrey Goldberg | H04B 7/0408 455/562.1 |
| 2009/0319236 A1* | 12/2009 | Blaunshtein | H04W 16/22 455/446 |
| 2011/0136478 A1* | 6/2011 | Trigui | H04W 24/02 455/418 |

(Continued)

OTHER PUBLICATIONS

International Search Report and Written Opinion dated Mar. 28, 2019 corresponding to International Patent Application No. PCT/US2018/043135.

*Primary Examiner* — Kenneth T Lam
(74) *Attorney, Agent, or Firm* — Squire Patton Boggs (US) LLP

(57) ABSTRACT

In accordance with some embodiments, an apparatus, comprising at least one processor and at least one memory including computer program code. The at least one memory and the computer program code are configured to, with the at least one processor, cause the apparatus to transmit at least one data packet according to a link budget. The apparatus may further adjust at least one antenna beam steering angle in 3-dimensions according to an optimum dither angle or plurality of dither angles. The apparatus may further adjust at least one antenna pattern according to a predetermined tilt.

17 Claims, 10 Drawing Sheets

(56) References Cited

U.S. PATENT DOCUMENTS

| | | | |
|---|---|---|---|
| 2011/0199992 A1* | 8/2011 | Barker | H01Q 1/246 |
| | | | 370/328 |
| 2013/0201003 A1 | 8/2013 | Sabesan et al. | |
| 2017/0170556 A1* | 6/2017 | Carey | H01Q 3/2611 |
| 2018/0054772 A1* | 2/2018 | Tan | H04W 28/0236 |
| 2018/0205422 A1* | 7/2018 | Feldhahn | H04B 7/0617 |
| 2018/0323844 A1* | 11/2018 | Baldemair | H04L 27/2626 |
| 2021/0345129 A1* | 11/2021 | Gupta | H04W 16/18 |
| 2022/0029697 A1* | 1/2022 | Bakr | H04W 4/06 |

\* cited by examiner

ACTIVE ANTENNA ARRAY DITHERING TO IMPROVE SCANNING EFFICIENCY AND REDUCE BEAM INDICES

BACKGROUND

Field

Certain embodiments may relate to communication systems. For example, some embodiments may relate to antenna array dithering.

Description of the Related Art

5th generation (5G) wireless networks may have a wide band path loss in certain areas that is caused by multipath propagation of antenna beams, such as those with line of sight (LOS) and no line of sight (NLOS). Furthermore, 5G wireless networks utilize a wide spectrum available, such as those above 24 GHz, by using active antenna arrays. This may be due to the combination of high path loss and low power capability of active devices at certain frequencies. This combination of limitations may be overcome by using a multiplicity of radiating elements and active devices connected directly to the radiating elements, suitably phased, to form an active array. Active arrays provide signal gain at the expense of becoming highly directive with deep nulls. This may become an impediment to detecting users entering the cell/coverage area because it renders the base radio undetectable to users except for those in the direction of boresight.

SUMMARY

In accordance with some embodiments, a method may include transmitting, by a network entity, at least one data packet according to a link budget. The method may further include adjusting, by the network entity, at least one antenna beam steering angle in 3-dimensions according to an optimum dither angle. The method may further include adjusting, by the network entity, at least one antenna pattern according to a predetermined tilt.

In accordance with some embodiments, an apparatus may include means for transmitting at least one data packet according to a link budget. The apparatus may further include means for adjusting at least one antenna beam steering angle in 3-dimensions according to an optimum dither angle. The apparatus may further include means for adjusting at least one antenna pattern according to a predetermined tilt.

In accordance with some embodiments, an apparatus may include at least one processor and at least one memory including computer program code. The at least one memory and the computer program code can be configured to, with the at least one processor, cause the apparatus to at least transmit at least one data packet according to a link budget. The at least one memory and the computer program code can be further configured to, with the at least one processor, cause the apparatus to at least adjust at least one antenna beam steering angle in 3-dimensions according to an optimum dither angle. The at least one memory and the computer program code can be further configured to, with the at least one processor, cause the apparatus to at least adjust at least one antenna pattern according to a predetermined tilt.

In accordance with some embodiments, a non-transitory computer readable medium can be encoded with instructions that may, when executed in hardware, perform a method. The method may transmit at least one data packet according to a link budget. The method may further adjust at least one antenna beam steering angle in 3-dimensions according to an optimum dither angle. The method may further adjust at least one antenna pattern according to a predetermined tilt.

In accordance with some embodiments, a computer program product may perform a method. The method may transmit at least one data packet according to a link budget. The method may further adjust at least one antenna beam steering angle in 3-dimensions according to an optimum dither angle. The method may further adjust at least one antenna pattern according to a predetermined tilt.

In accordance with some embodiments, an apparatus may include circuitry configured to transmit at least one data packet according to a link budget. The circuitry may further adjust at least one antenna beam steering angle in 3-dimensions according to an optimum dither angle. The circuitry may further adjust at least one antenna pattern according to a predetermined tilt.

BRIEF DESCRIPTION OF THE DRAWINGS

For proper understanding of this disclosure, reference should be made to the accompanying drawings, wherein.

DETAILED DESCRIPTION

Certain embodiments described herein may have various benefits and/or advantages. For example, some embodiments may reduce the number of beam indices that need to be checked, improving the likelihood of a user being detected on the first azimuthal scan. In addition, certain embodiments may reduce user acquisition and handoff delay, and improve the overall efficiency of the channel by conserving resource for scanning and increasing the reach of the radio unit. Some embodiments may also conduct multiple scans at different elevations, with a minimal impact to a majority of users. Certain embodiments are, therefore, directed to improvements in computer-related technology, specifically, by conserving network resources and reducing power consumption of network entities and/or user equipment located within the network.

In some technologies, such as mmWave, radio units may be mounted atop various structures at moderate heights, such as 6 m. Active device limitations, as well as the limited availability of suitable mounting points for radio units, has resulted in products which require supporting deployment spacing of several hundred meters. At this range, user equipment would need to be located at a particular elevation angle, such as at or below 2 degrees below the horizontal. Given that a link budget generally allows for a 3 dB beamwidth, an antenna array with a 5 degree beamwidth in the vertical plane could be tilted, such as to −4.5 degrees. User equipment may then connect from the network entity's maximum range, and as close as the point to where it would fall to the first null of the antenna. Some embodiments may produce a first null at −7 degrees, which could correspond to a distance of about 48 meters.

As user equipment moves closer to the radio unit, the signal increases again due to the first lobe of the pattern. In an array where each element runs at the same signal level, such as with uniform illumination, the lobe may be 13 dB lower than the boresight. User equipment that falls within this lobe may need to be located at a particular elevation, such as in the order of −10 degrees, which could correspond to a distance of about 35 meters. At this proximity, the signal level may increase enough due to reduced path loss to overcome the gain loss of the antenna. A large portion of user equipment, in some cases 96%, may experience an optimally positioned single elevation. The remaining users may be seen by tilting the beam slightly, which would be unnoticeable to most users.

Figure 1:
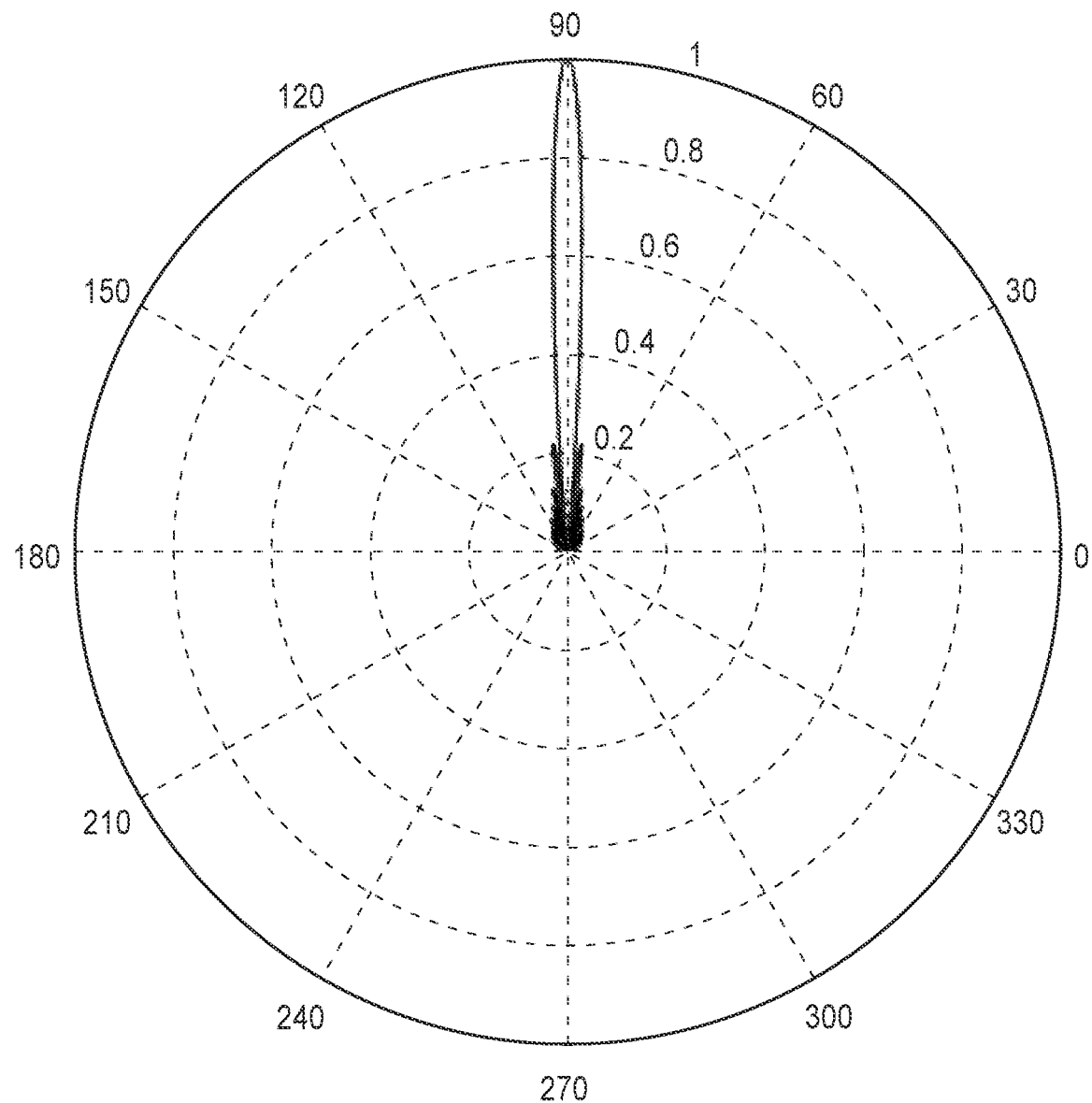
FIG. 1 illustrates an example of a narrow beam resulting from phase coherent summing.

An array consisting of M elements may provide a gain of $10*\log_{10}(M)$ decibels above the gain intrinsic to the radiating elements. In some embodiments, this array gain would occur when all of the phases are correct, but each point in space may result in a unique phase profile. Thus, for a given set of phase shifter settings, there may be only a single point in space, such as at boresight, which may yield a correct phase for each contributor with maximum gain. Boresight may be the position that a beam is steered to, and may be most often associated with a maximum gain. Moving away from the boresight results in reduced gain, as illustrated in FIG. 1

Figure 2:
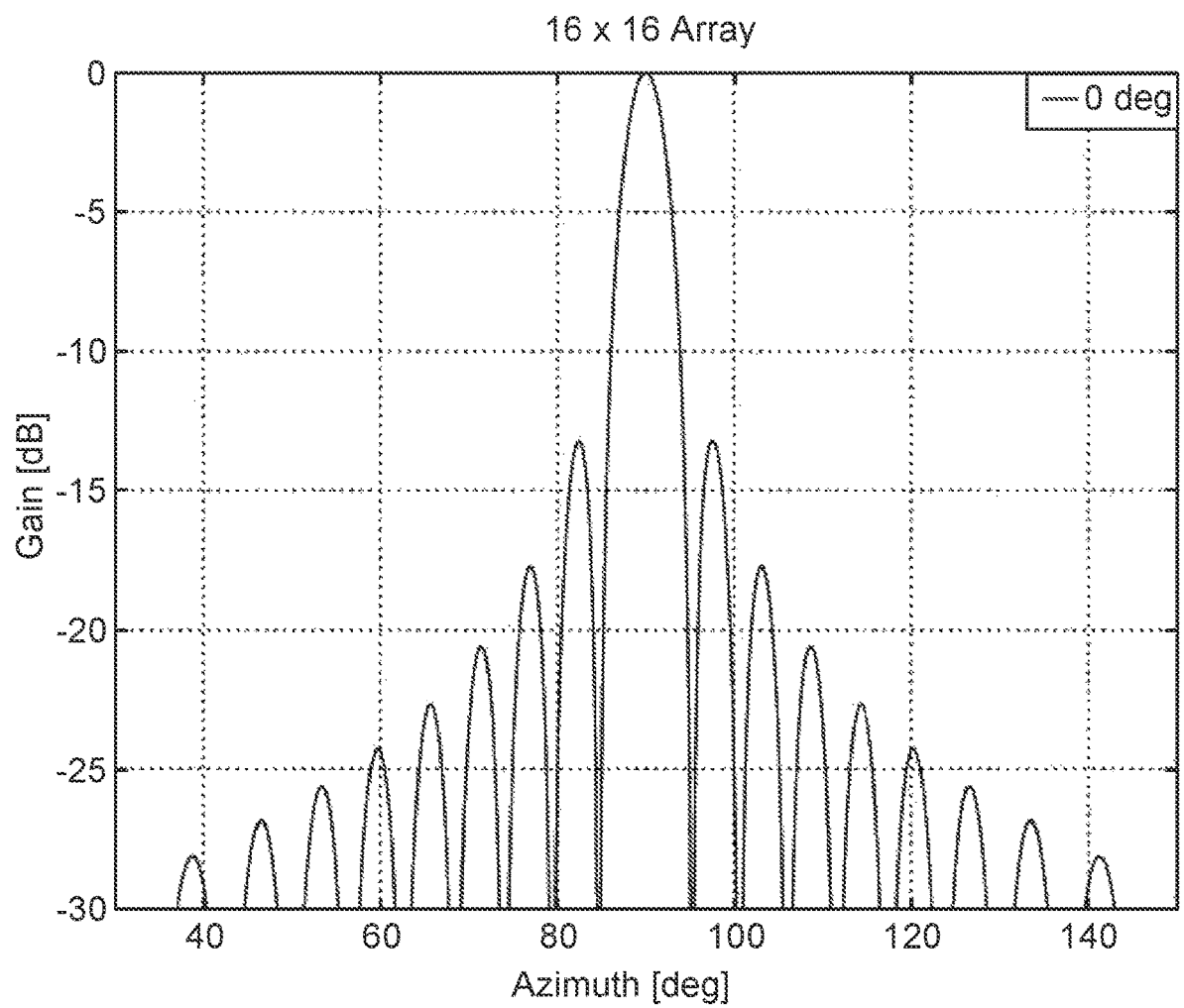
FIG. 2 illustrates an example of an expanded view showing deep nulls away from a boresight.

In some embodiments, signals at various angles may be in antiphase, cancelling each other and resulting in deep pattern nulls, which is illustrated in FIG. 2. This characteristic is the directivity of the antenna array, and is a consequence of the gain benefit.

These principles apply in the case of transmission, with the same effects in gain and directivity. However, M power amplifiers may make M identical copies of the signal being transmitted. Such power amplifiers, such as mmWave radios, may contribute additional energy to the system of $10 \log_{10}(M)$ decibels. This may be in addition to the gain of the array, resulting in a net gain of $20 \log_{10}(M)$ decibels over the power, which may be provided by one of the active array power amplifiers, in addition to the gain of an individual radiator. With respect to receiving, this gain may only be realized at one point in space resulting in a gain of $10*\log_{10}(M)$ decibels above the gain intrinsic to the radiating elements.

In some embodiments, a link budget may be used to dimension the system to accommodate the furthest user equipment assuming a no line of sight (NLOS) path, as opposed to assumed to a direct line of sight (LOS) or some statistical fraction of user equipment that has an LOS path and the remainder having an NLOS path. In an example embodiment, path loss may be calculated by using a close in multi-frequency (CIF) free space reference distance model. Using this model, the signal associated with path loss may be 22 dB higher at the distance corresponding to the first lobe compared to being located at the range of maximum coverage. Thus, path loss effect may overcome some or all antenna loss.

Figure 3:
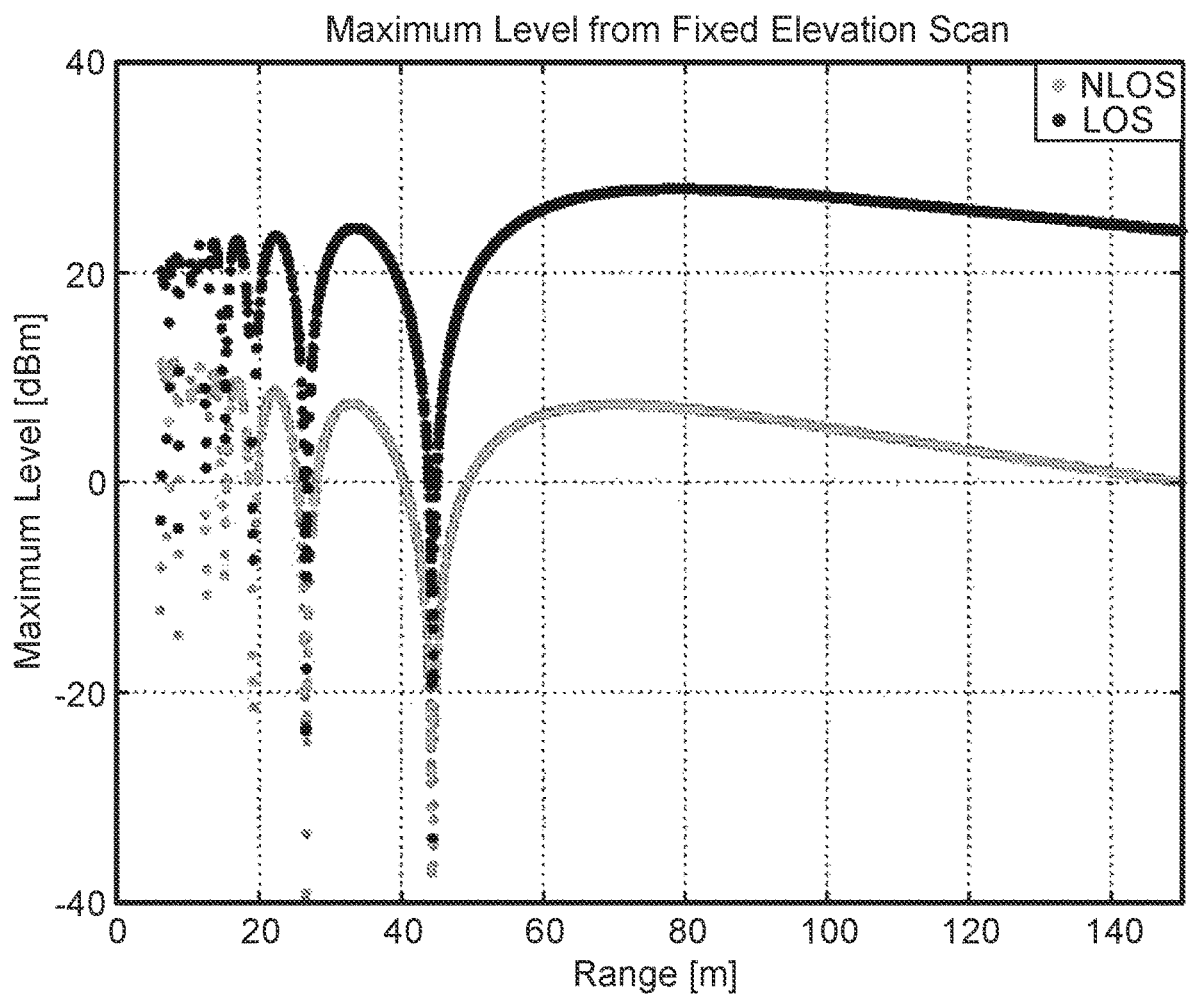
FIG. 3 illustrates an example of a signal level relative to fringe user equipment with a fixed elevation antenna.

Similarly, other lobes which correspond to being closer to the radio unit may experience the same effects. For example, the higher order lobe gain diminishes in an approximately sin c( ) function. However, the path loss for NLOS may be proportional to the distance of a power of 3.5, which may overcome the pattern loss for all but the highest order lobes. As a result, user equipment being received on this first lobe may be stronger than the same user equipment located at the maximum distance and being received on boresight, as illustrated in FIG. 3.

Figure 4:
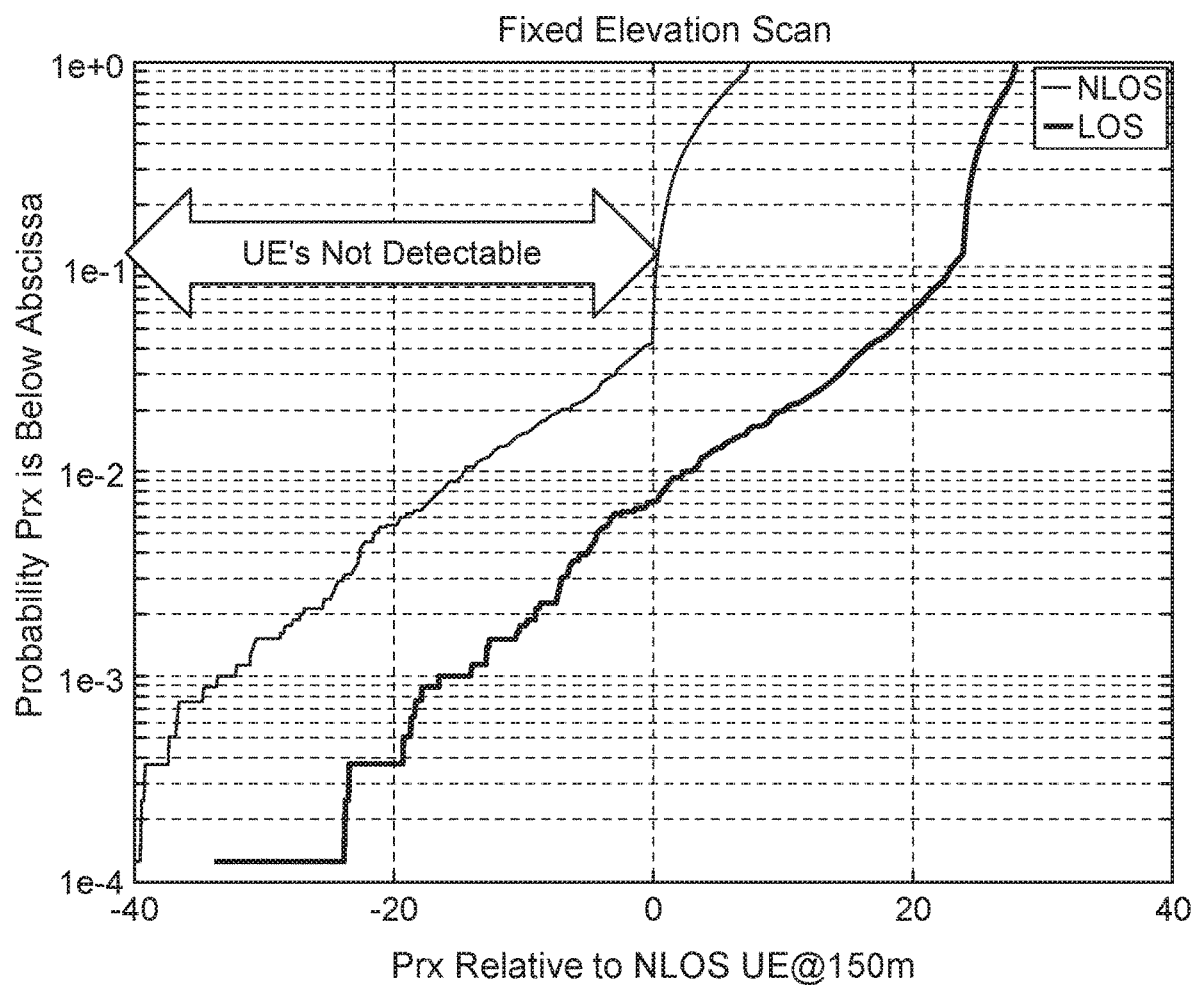
FIG. 4 illustrates an example of a signal level CDF relative to a fringe user equipment with fixed elevation antenna.

As shown in FIG. 4, for the LOS, the signal gain due to proximity does not increase as rapidly as the pattern gain is decreasing. For example, the received signal level power is proportional to distance squared, as compared to a power of 3.5 for NLOS. This is insignificant when the system is dimensioned for the worst case of NLOS path to the most distant user since the LOS signal level may begin higher. In addition, it may be higher than an NLOS path with the NLOS situation being a controlling scenario.

Furthermore, FIG. 4 shows that, although the signal level for NLOS has an overall increasing trend as the user equipment moves closer to the radio unit, there are some regions where the signal level may drop below a required minimum, corresponding to the nulls in the antenna pattern. In some embodiments, a predetermined tilt in the antenna pattern may direct enough energy to at least one null region such that the minimum signal level may be exceeded, recovering dead spots. As a result, a minimal number of user equipment, such as about 4%, are impacted which were seen in the initial beam. Thus, the elevation may be toggled or dithered between subsequent scans in azimuth.

In some embodiments, the dithering may be in a vertical plane. In other embodiments, the dithering may be in the azimuthal plane, or vertical plane and azimuthal plane simultaneously. The same problem of deep nulls also occurs in the polarization domain and especially with linear polarization when the signal E-field polarization is orthogonal to the antenna E-field polarization. Thus, some embodiments may include dithering of the polarization to reduce the effect of the nulls.

Although the original motivation is to solve coverage challenges with present day mmWave antenna arrays which utilized analog beam steering, this same idea can be applied to both digital beam forming as is typical at sub 6 GHz applications and also to hybrid beam forming which is the likely evolution of mmWave solutions.

As an example, on a first scan, approximately 96% of user equipment may be receivable. On a subsequent scan, and at a slightly different angle, the remaining user equipment may be seen, where a small percentage of user equipment, such as 4%, which were seen on the first scan are lost. Thus, the net effect is that all possible users may be detectable by the user equipment if the user list from the two scans is aggregated. The result may be an effect analogous to beam spreading, but with less gain penalty.

Figure 5:
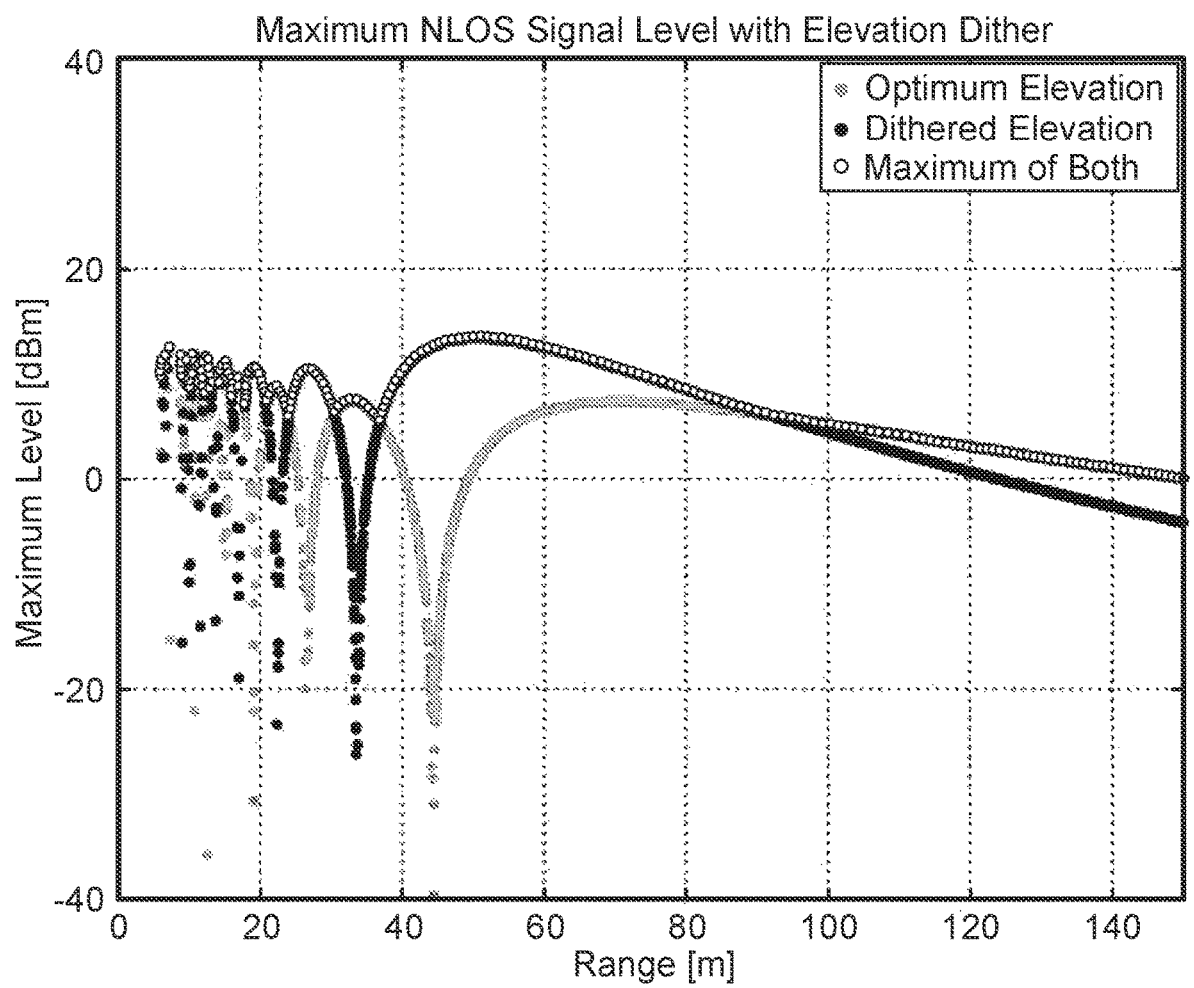
FIG. 5 illustrates an example of no line of sight path loss for optimum and dithered beams and their maximum value.
Figure 6:
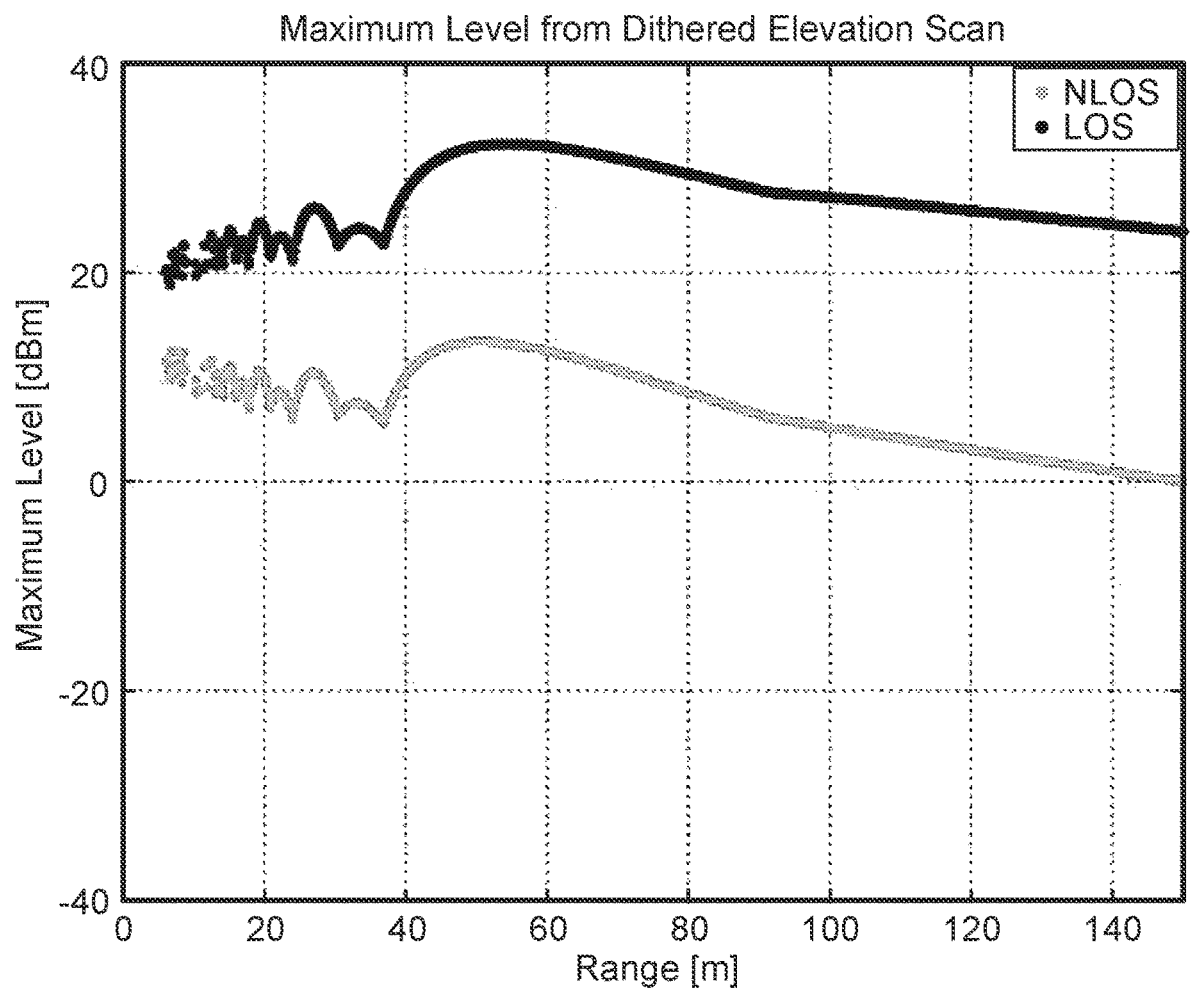
FIG. 6 illustrates an example of a maximum received signal between two elevation scans dithered by beamwidth/2.

As illustrated in FIGS. 5 and 6, the optimum "dither" angle may be beamwidth/2. This may maximize the received signal power from user equipment located at any arbitrary distance. Furthermore, the signal level may be higher than the minimum necessary power regardless of the path loss assumed.

Figure 7:
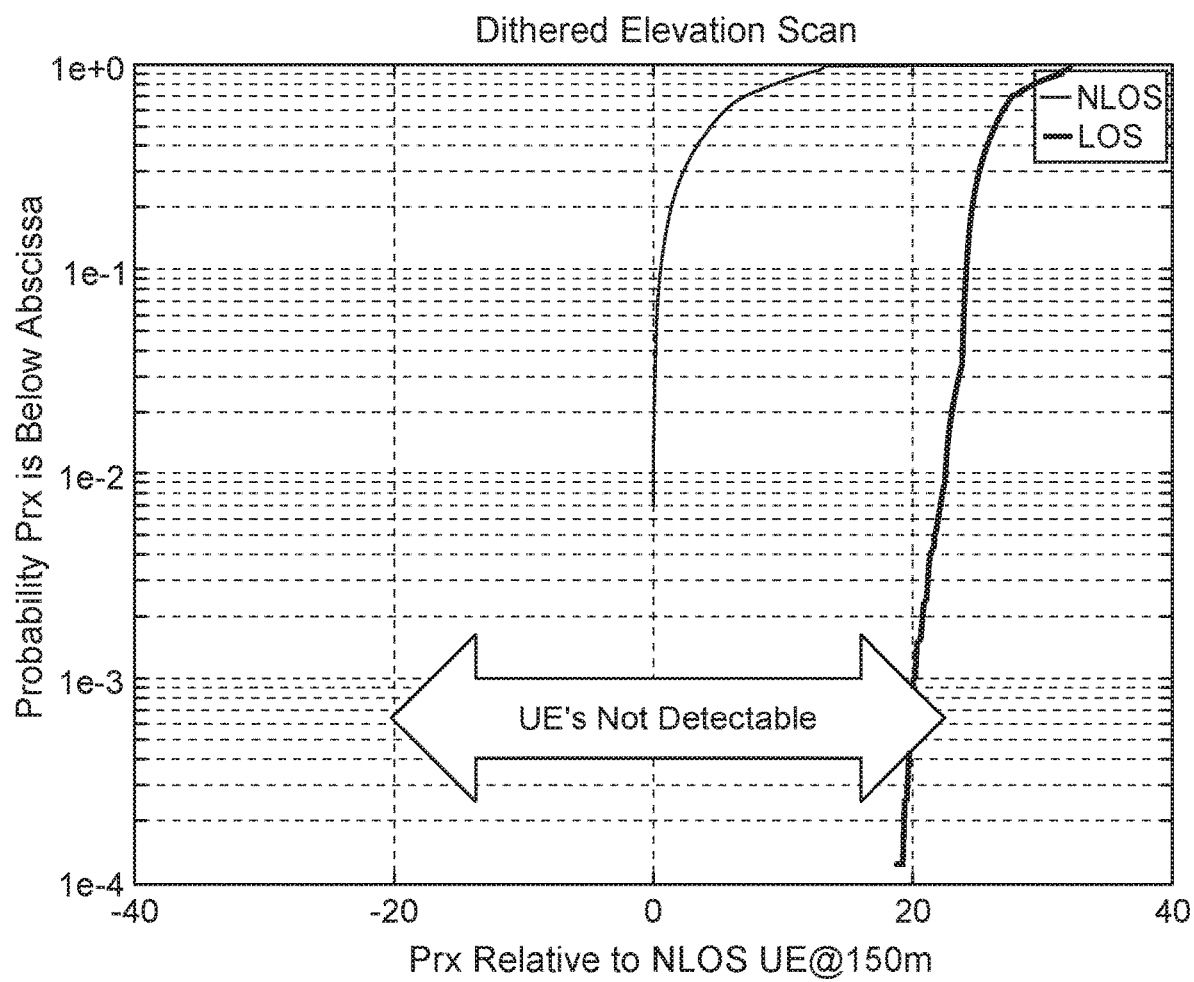
FIG. 7 illustrates an example of a maximum received signal CDF between two elevation scans dithered by beamwidth/2.
Figure 8:
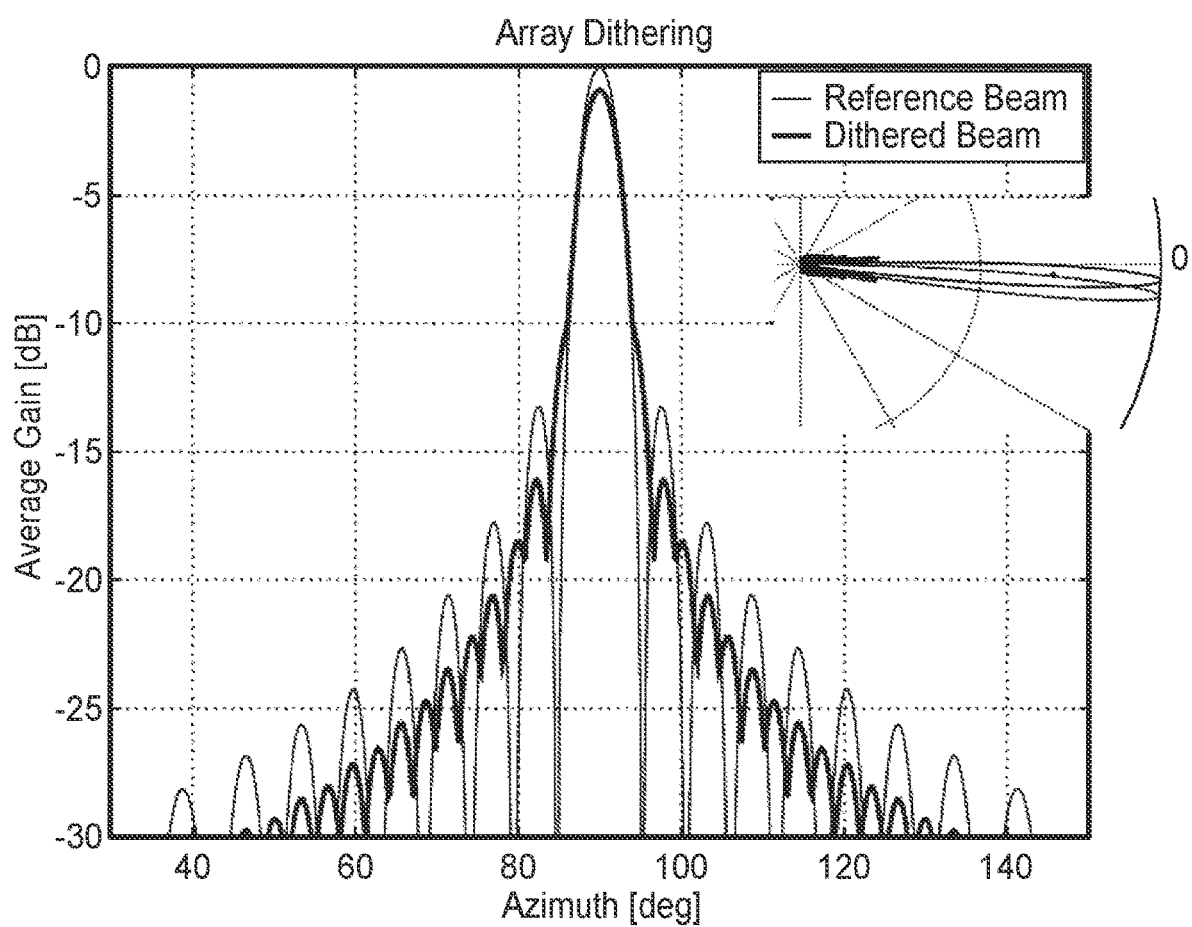
FIG. 8 illustrates an example of average gain with dither equal to beamwidth compared to no dither.

As illustrated in FIGS. 7 and 8, based on the antenna pattern characteristic in aggregate between two dithered scans, it behaves like antenna with null filling, but may have less than 1 dB of gain penalty.

This dithering effect may be implemented in an active array. In order to steer a beam, a phase shift may be applied to each element that it accumulates. For example, the amount of phase shift required at a $k^{th}$ element relative to the first element in the array, where k=1, is $\Psi_k=(k-1)\cdot\Psi_0$ and $\Psi_0=2\pi(d/\lambda)\sin\theta_0$, where $\theta_0$ is the target angle to steer to, d is the spacing between elements, and $\lambda$ is the wavelength. By extension, if it is desired to dither the beam by some angle $\delta$, the steering phase becomes $\Psi_{dithered}=2\pi(d/\lambda)\sin(\theta_0+\delta)$.

In some embodiments, $\delta$, which may be optimally in the order of the beamwidth/2, may be come small in the case for large arrays typical of what is needed in some systems, such as a mmWave system. As noted above, an optimal beam steering angle may be only slightly below horizontal. As a result, $\theta_0$ may be small as well, and may allow considerable simplification, as denoted by $\Psi_{dithered}\approx 2\pi(d/\lambda)\sin(\theta_0+\delta)=2\pi(d/\lambda)[\sin\theta_0\cdot\cos\delta+\cos\theta_0\cdot\sin\delta]$.

In some embodiments where $\delta$ and $\theta$ are small, an approximation may be determined using $\Psi_{dithered}\approx 2\pi(d/\lambda)[\theta_0+\delta]=\Psi_0+\Psi_{offset}$, where $\Psi_{offset}=2\pi(d/\lambda)\delta$=constant. Thus, the dithered beam may be determined by adding a precomputed constant, as given in the previous equation, to the array phasing coefficients for the primary beam. This may alleviate the requirement to include steering phases for the dithered beam, and may not increase the size of any lookup table. This dithering may be performed autonomously, such as by using at least one beam controller.

Figure 9:
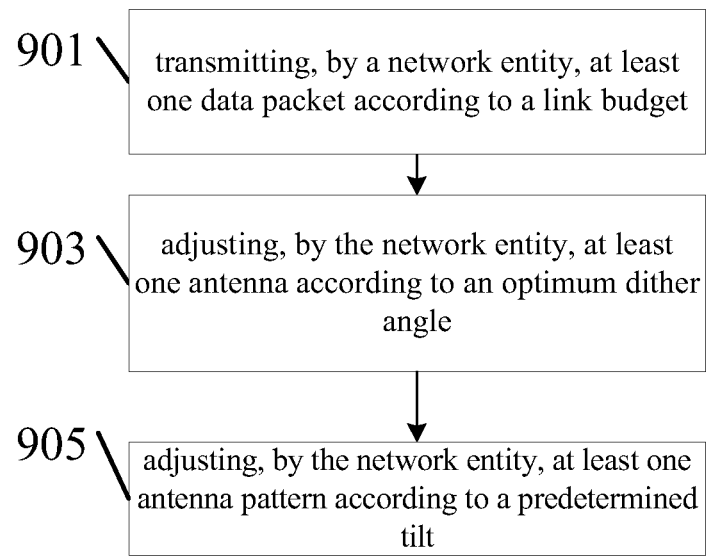
FIG. 9 illustrates an example of a method performed by a network entity according to certain embodiments.
Figure 10:
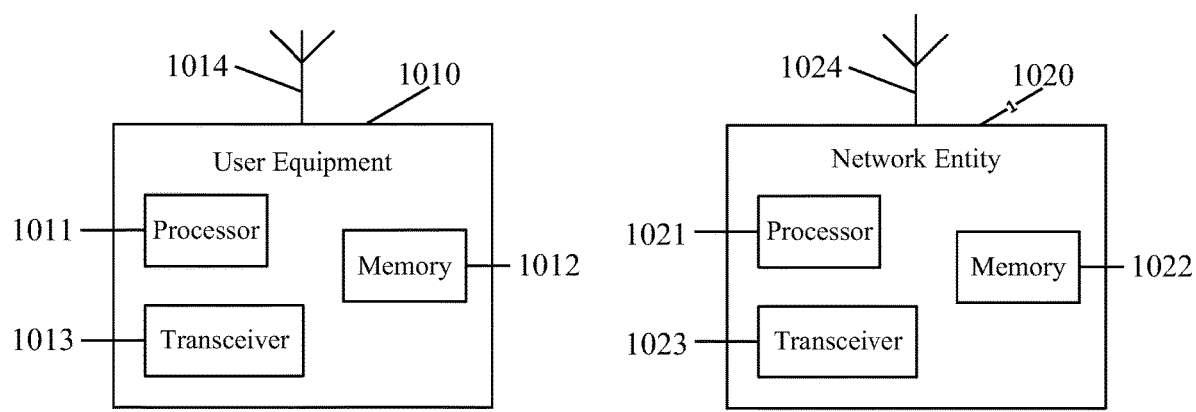
FIG. 10 illustrates an example of a system according to certain embodiments.

FIG. 9 illustrates an example of a method performed by a network entity, such as network entity 1010 in FIG. 10. In step 901, the network entity may transmit at least one data packet according to a link budget. In step 903, the network entity may adjust at least one antenna according to an optimum dither angle. In step 905, the at least one network entity may adjust at least one antenna pattern according to a predetermined tilt.

In some embodiments, the predetermined tilt in the antenna pattern may redirect energy to at least one null region. In addition, the redirected energy to at least one null region may exceed a minimum signal level and/or recovers an area of no signal coverage. In various embodiments, the elevation may be toggled or dithered between subsequent scans in azimuth. The link budget may dimension the system to accommodate the furthest user equipment assuming a no line of sight (NLOS) path. In certain embodiments, path loss may be calculated by using a close in multi-frequency (CIF) free space reference distance model. The signal associated with path loss may be 22 dB higher at the distance corresponding to a first lobe compared to being located at a range of maximum coverage. In addition, the dither angle may be according to beamwidth/2, and maximizing the received signal power from user equipment located at any arbitrary distance, and/or the dithered beam may be determined by adding a precomputed constant to at least one array phasing coefficient for the primary beam. In some embodiments, the dithering is performed autonomously using at least one beam controller.

FIG. 10 illustrates an example of a system according to certain embodiments. In one embodiment, a system may include multiple devices, such as, for example, user equipment 1010 and/or network entity 1020.

User equipment 1010 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 1020 may be one or more of a base station, such as a mmWave antenna, an evolved node B (eNB) or 5G or New Radio node B (gNB), a serving gateway, a server, and/or any other access node or combination thereof. Furthermore, network entity 1010 and/or user equipment 1020 may be one or more of a citizens broadband radio service device (CBSD).

One or more of these devices may include at least one processor, respectively indicated as 1011 and 1021. Processors 1011 and 1021 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 1012 and 1022. The memory may be fixed or removable. The memory may include computer program instructions or computer code contained therein. Memories 1012 and 1022 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 1011 and 1021 and memories 1012 and 1022 or a subset thereof, may be configured to provide means corresponding to the various blocks of FIGS. 1-9. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 10, transceivers 1013 and 1023 may be provided, and one or more devices may also include at least one antenna, respectively illustrated as 1014 and 1024. The device may have many antennas, such as an array of antennas configured for multiple input multiple output (MIMO) communications, or multiple antennas for multiple radio access technologies. Other configurations of these devices, for example, may be provided. Transceivers 1013 and 1023 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-9). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-9. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary
3 GPP 3rd Generation Partnership Project
5G 5th Generation Wireless System
EIRP Effective Isotropic Radiated Power
EIS Effective Isotropic Sensitivity
Gen4 4th Generation Architectural Solution for 5G mmWave Products
LOS Line of Sight
LUT Look Up Table
mmWave Frequencies typically above 24 GHz
NLOS None Line of Sight
RU Radio Unit
UE User Equipment
UL Uplink
URLLC Ultra-reliable Low Latency Communication
RRC Radio Resource Control
SR Scheduling Request
TB Transmission Block

I claim:

1. A method, comprising:
   transmitting, by a network entity, at least one data packet according to a link budget;
   adjusting, by the network entity, at least one antenna beam steering angle in 3-dimensions according to an optimum dither angle; and
   adjusting, by the network entity, at least one antenna pattern according to a predetermined tilt,
   wherein the optimum dither angle is in proportion to beamwidth, and maximizing a received signal power from user equipment located at any arbitrary distance.

2. The method according to claim 1, wherein the predetermined tilt in the antenna pattern redirects energy to at least one null region.

3. The method according to claim 2, wherein the redirected energy to at least one null region exceeds a minimum signal level or recovers an area of no signal coverage.

4. The method according to claim 1, wherein an elevation may be toggled or dithered between subsequent scans in azimuth plane or vertical plane or in the electromagnetic field.

5. The method according to claim 1, wherein the link budget dimensions the system to accommodate the furthest user equipment assuming at least one of a no line of sight (NLOS) path and some faction of users with an NLOS path and LOS path.

6. The method according to claim 1, wherein a signal associated with path loss is a predetermined value higher at the distance corresponding to a first lobe compared to being located at a range of maximum coverage.

7. The method according to claim 1, wherein a dithered beam is determined by adding at least one precomputed constant to at least one array phasing coefficient for the primary beam.

8. The method according to claim 1, wherein the dithering is performed autonomously using at least one beam controller.

9. A computer program embodied on a non-transitory computer-readable medium, said computer program comprising instructions that, when executed in hardware, cause the hardware to perform a method according to claim 1.

10. An apparatus, comprising:
    at least one processor; and
    at least one memory including computer program code,
    wherein the at least one memory and the computer program code are configured to, with the at least one processor, cause the apparatus to:
    transmit at least one data packet according to a link budget;
    adjust at least one antenna beam steering angle in 3-dimensions according to an optimum dither angle; and
    adjust at least one antenna pattern according to a predetermined tilt,
    wherein the optimum dither angle is in proportion to beamwidth, and maximizing a received signal power from user equipment located at any arbitrary distance.

11. The apparatus according to claim 10, wherein the predetermined tilt in the antenna pattern redirects energy to at least one null region.

12. The apparatus according to claim 11, wherein the redirected energy to at least one null region exceeds a minimum signal level or recovers an area of no signal coverage.

13. The apparatus according to claim 10, wherein an elevation may be toggled or dithered between subsequent scans in azimuth plane or vertical plane or in the electromagnetic field.

14. The apparatus according to claim 10, wherein the link budget dimensions the system to accommodate the furthest user equipment assuming at least one of a no line of sight (NLOS) path and some faction of users with an NLOS path and LOS path.

15. The apparatus according to claim 10, wherein a signal associated with path loss is a predetermined value higher at a distance corresponding to a first lobe compared to being located at a range of maximum coverage.

16. The apparatus according to claim 10, wherein a dithered beam is determined by adding at least one precomputed constant to at least one array phasing coefficient for a primary beam.

17. The apparatus according to claim 10, wherein a dithering is performed autonomously using at least one beam controller.

\* \* \* \* \*